July 6, 1948.  J. G. JACKSON ET AL  2,444,648
CURRENT DISTRIBUTION DUCT
Filed May 5, 1942  5 Sheets-Sheet 1
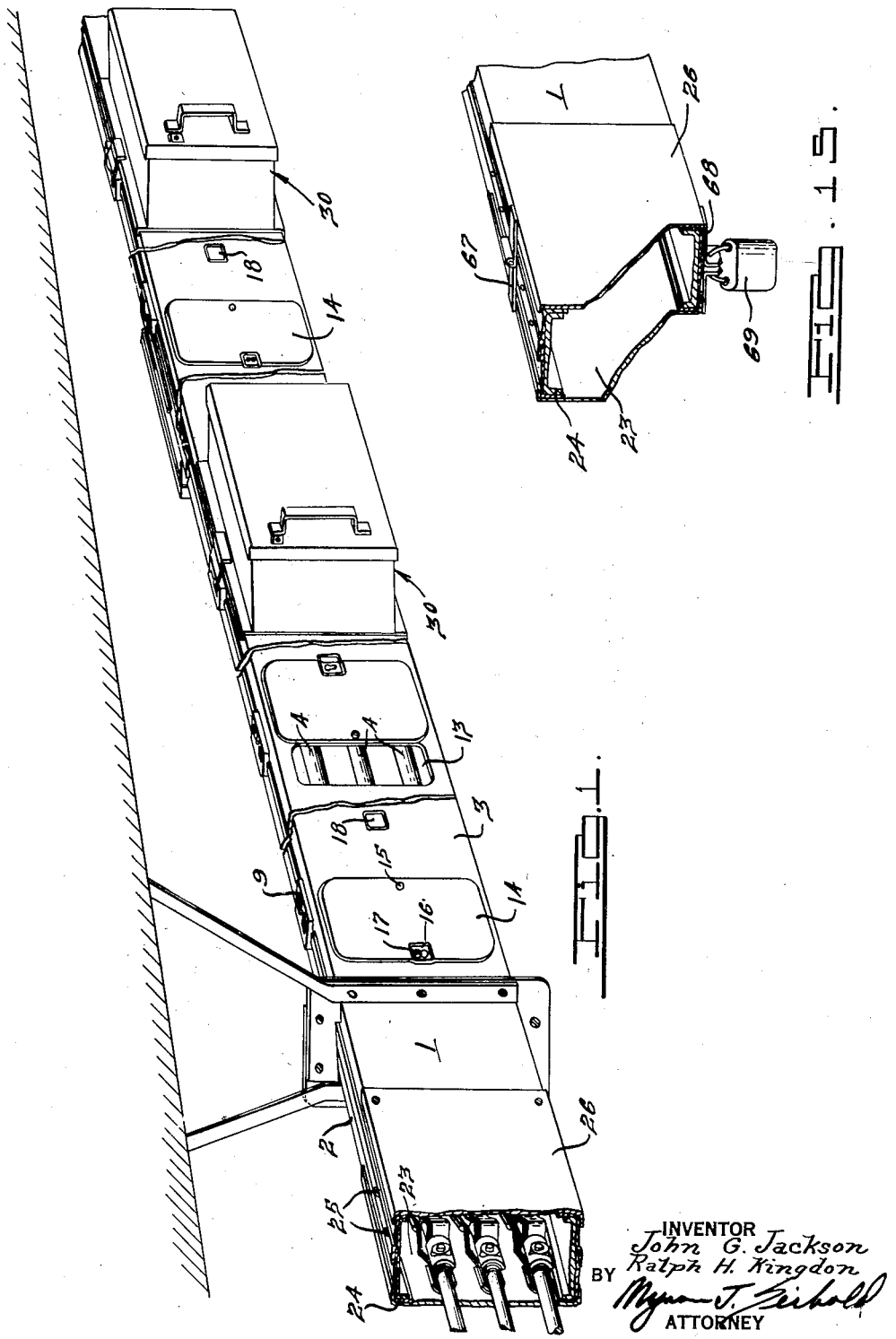
INVENTOR
John G. Jackson
BY Ralph H. Kingdon
ATTORNEY

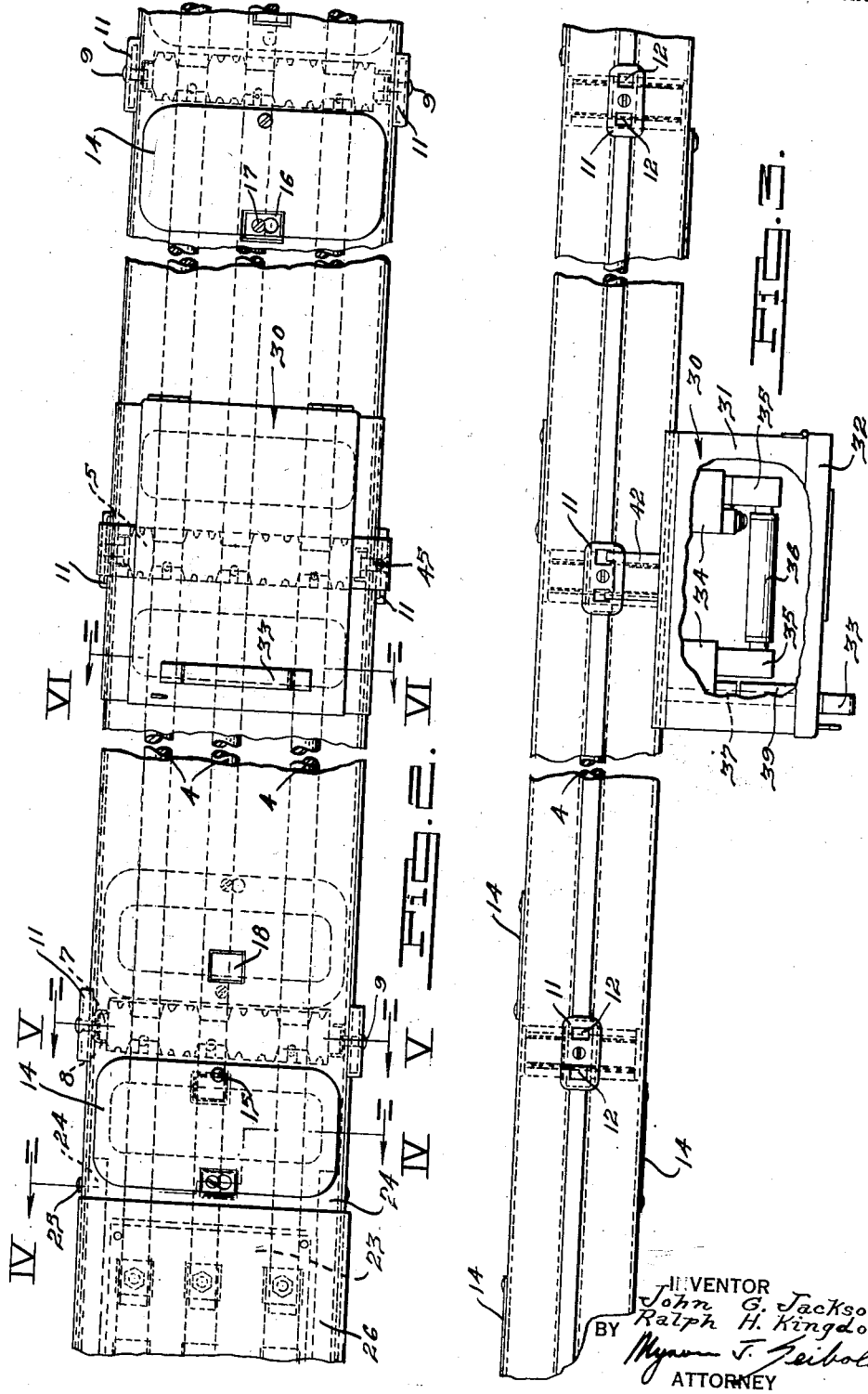

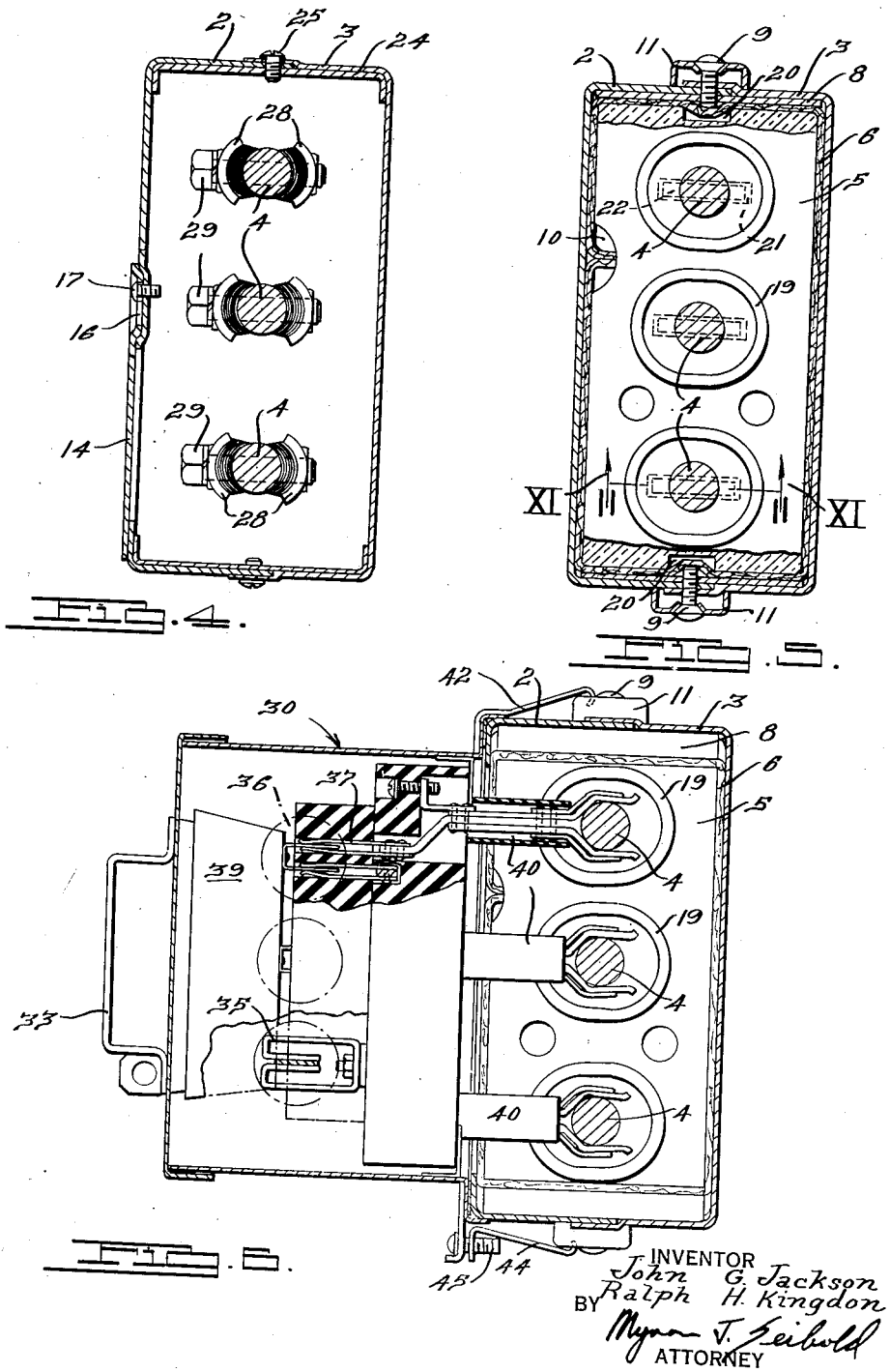

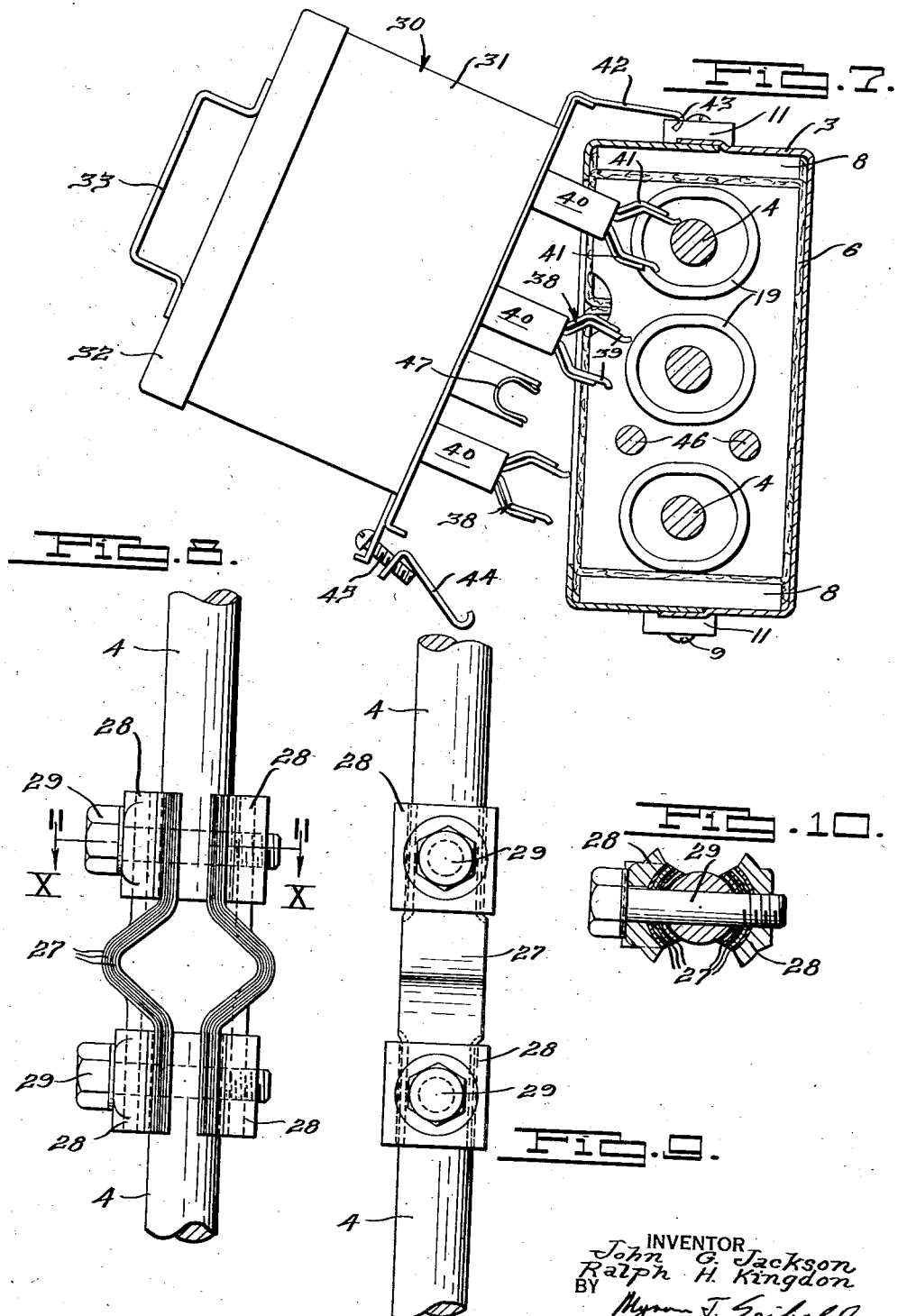

July 6, 1948.
J. G. JACKSON ET AL
CURRENT DISTRIBUTION DUCT
2,444,648
Filed May 5, 1942
5 Sheets-Sheet 5
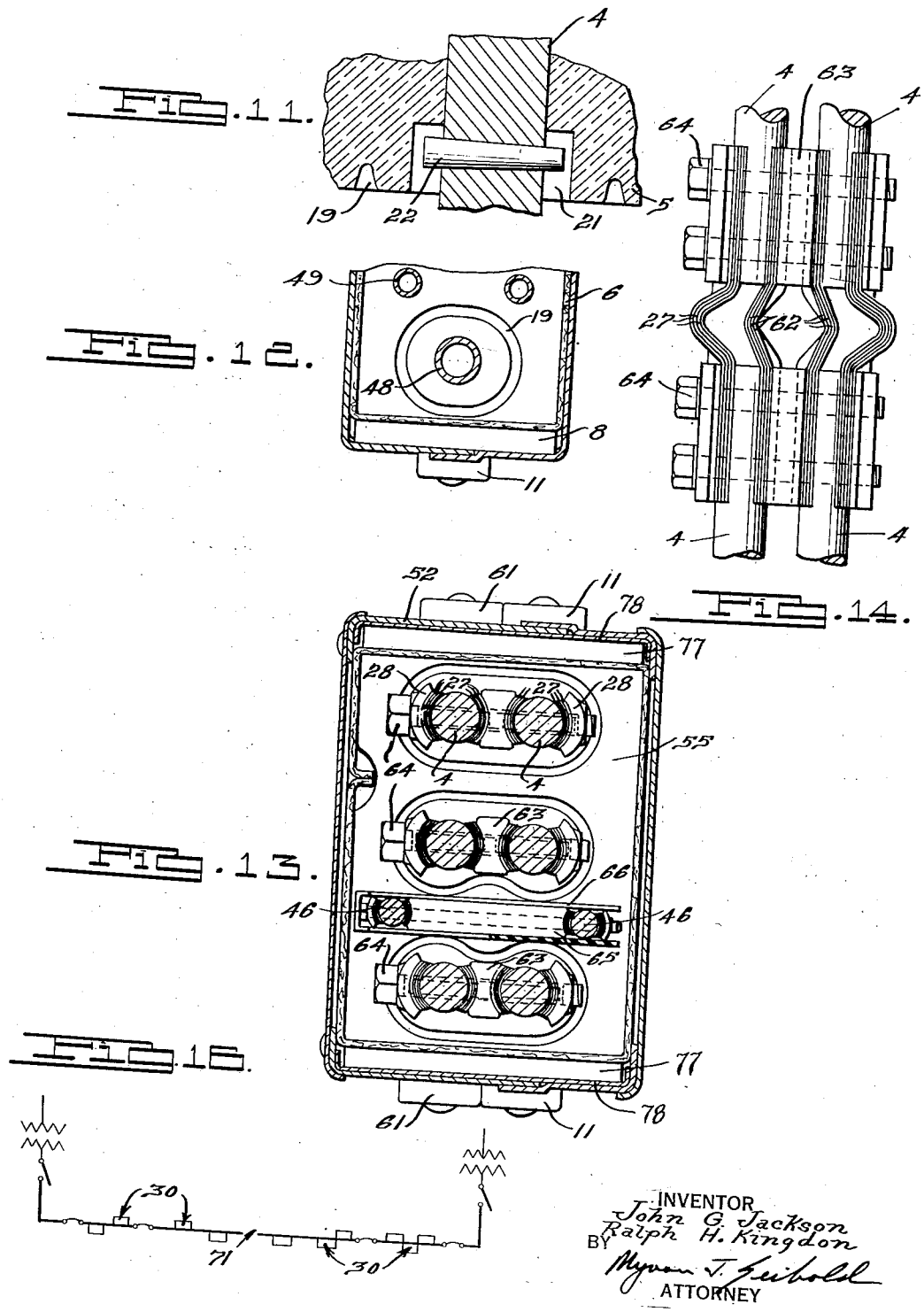
INVENTOR
John G. Jackson
Ralph H. Kingdon
BY
Myron J. Seibold
ATTORNEY Patented July 6, 1948

2,444,648

UNITED STATES PATENT OFFICE 2,444,648

CURRENT DISTRIBUTION DUCT

John G. Jackson and Ralph H. Kingdon, Detroit, Mich., assignors to Square D Company, Detroit, Mich., a corporation of Michigan Application May 5, 1942, Serial No. 441,826

18 Claims. (Cl. 174—72)

This invention relates to an apparatus and system for current distribution, and more particularly to current distribution apparatus and system of the duct enclosed, rigid conductor type providing for the reception and attachment of current take off devices at spaced intervals along the duct.

An object of this invention is to provide an improved form of current distribution system and apparatus employing rigid conductors enclosed within duct provided with spaced means for connection of current take off devices supported thereon.

Another object of the invention is to provide an electrical distribution system of the duct enclosed, rigid conductor type providing for flexibility and variation in the rating of enclosed conductors while maintaining standardized current take off devices to be associated therewith.

Another object of the invention is a current distribution system of the duct enclosed, rigid conductor type in which the conductors are of most efficient form for the transmission of current at varied ratings while adapted for attachment to standardized current take off devices.

Another object of the invention is to provide an improved mounting and attaching means for a current take off device on a duct enclosing rigid conductors to which the current take off device is connected.

Another object of the invention is to provide an improved joining means for the conductor sections of a duct enclosed system providing for limited relative movement between sections of the conductors.

Another object of the invention is to provide joining means for conductor sections in a duct enclosed system in which the isolation and/or separate feeding of various groups of conductor sections of the system may be facilitated.

Other objects and features of the invention will be readily apparent to those skilled in the art from the specification and appended drawings illustrating certain preferred embodiments in which:

Figure 1 is a perspective view of a current distribution system according to the present invention.

Figure 2 is a side elevational view of a duct system according to the present invention.

Figure 3 is a top plan view of the duct system of Figure 2.

Figure 4 is a broken line sectional view on the line IV—IV of Figure 2.

Figure 5 is a sectional view on the line V—V of Figure 2.

Figure 6 is a sectional view on the line VI—VI of Figure 2.

Figure 7 is a view similar to Figure 5, showing the manner of mounting and attaching or dismounting and detaching a current take off unit from the duct.

Figure 8 is an enlarged detailed view of a connection between conductor sections.

Figure 9 is a plan view of the connection of Figure 8.

Figure 10 is a sectional view on the line X—X of Figure 8.

Figure 11 is an enlarged partial sectional view on the line XI—XI of Figure 5.

Figure 12 is a partial sectional view illustrating the utilization of tube conductors for lower current values.

Figure 13 is a sectional view of an enlarged current capacity distribution system according to the present invention.

Figure 14 is a detailed view of the connection between conductor sections for the enlarged current capacity duct of Figure 13.

Figure 15 is a perspective view of a sealable junction cover.

Figure 16 is a schematic view of one manner of isolating and separately feeding groups of conductor sections of a duct system.

The current distribution system of this invention, as illustrated in Figures 1 to 12, inclusive, is composed of a plurality of sections joined together in end to end relation to form any desired ultimate total system length. Each of the sections includes a rectilinear shaped outer enclosing duct 1 made up of two U-shaped sections 2 and 3. The legs of the U-shaped section 2 are straight, as shown, and the ends of the legs of the U-shaped section 3 are offset from the plane of the main portions of the legs by the thickness of the material so that with the sections joined substantially smooth inner faces at the top and bottom of the duct are provided. Within the duct are disposed the substantially rigid conductor sections 4 of rod or tubular form, depending upon the current value for which the system is designed, as will be more fully explained hereinafter. Conductors 4 are supported within the duct by extending through a plurality of spaced insulator blocks 5 which are of rectilinear form and whose exterior dimensions are slightly less than the interior dimensions of the duct to accommodate a felt strip 6 which serves as a gasket or cushion to maintain the insulator tightly within the duct without damage. The top and bottom portions of the insulator 5 are reduced in thickness as at 7 and embracing the reduced sections 7 are channel shaped metallic members 8 which extend transverse to the axis of the duct against the top and bottom interior surfaces thereof. The overlapped ends of duct sections 2 and 3 are provided with holes through which extend studs 9 threaded into the channel shaped members 8 and having their heads engaging cup-shaped elements 11 on the exterior top and bottom surfaces of the duct. The cup-shaped members 11 have their end walls notched as indicated in Figure 6 to receive the offset portions of the legs of the duct section 3 so that the members 11 are prevented from turning. The bases of the cups 11 at opposite sides of the studs 9 are provided with openings 12 for the attachment of current take off devices as will be hereinafter explained. Spaced along the length of the duct at opposite sides thereof and closely adjacent to the insulators 5 are openings 13, with the openings on the opposite sides of the duct offset on opposite sides of the insulators 5. It is through these openings 13 that portions of the current take off devices extend into engagement with the conductors within the duct to lead current therefrom to branch circuits. Each of the openings 13 is provided with a cover 14 having a stud 15 about which it is rotatable 180° to uncover the opening. The side of the cover 14 opposite the stud 15 is offset inwardly as at 16 to cooperate with a pair of indentations in the side walls of the duct; in one of which is provided the securing stud 17 preventing accidental opening of the covers, the other indentation 18 receiving the offset in the cover in its open position. The insulators 5 within the duct are preferably provided with deep grooves 19 about the openings receiving the conductors 4 to provide a greater creepage or leakage path between conductors 20. The insulators 5, at least at the opposite ends of the sections of the duct, are provided with deep notches 21 transverse to the openings through which the conductors 4 extend and at least at the opposite ends of the sections of conductors 4, pins 22 are provided seated within the notches or recesses 21 to prevent turning of the conductors and to prevent unusual longitudinal movement thereof relative to the insulators and outer enclosing duct. The top and bottom of the insulators are provided with clearance openings 20 for the studs 9 and side clearance grooves 10 receiving the ends of the felt strips 6. Studs 9 hold the insulators in place, mount the cups 11 and hold the duct sections 2 and 3 together.

The side walls of the duct sections at their opposite ends are cut out as at 23 to provide access to the connections between the conductor sections. U-shaped channels 24 are received against the top and bottom interior walls of the duct and have studs 25 threaded thereinto after passing through openings in the overlapped legs of the duct sections 2 and 3, the channels 24 thus serving to rigidly join together the adjacent ends of the sections of the duct system. Covers 26 attached by studs to the side walls of the duct are provided to cover the opens 23 in the duct walls. The conductors 4 are shorter than the duct enclosing them in each section so that with the duct sections joined together spaces are left between the ends of conductors 4. These adjacent ends of the conductors 4 are joined together by flexible links formed of a plurality of thin strips 27 of a conducting material such as copper, whose opposite ends are rigidly secured to the adjacent ends of the conductors 4. The ends of the strips 27 may be backed up by rigid structural members 28, as of steel, to which the ends of the strips 27 may be attached by tinning or brazing so that each section of the connection forms a self supporting structure. However, the intermediate portions of the strips 27 are left free so that the conductor is flexible between the end portions thereof, permitting them to move relative to each other. Two connector portions are provided which are identical except that one side has a hole through which the bolt 29 extends and the one on the opposite side of the conductor has a threaded opening into which the bolts 29 pass through openings provided adjacent the ends of the conductors 4. The openings in the conductors 4 through which the studs 29 extend and the direction of the pins 22 are related so that with the conductors 4 held against rotation, the studs 29 extend transversely of the duct to make the studs more readily accessible through the openings 23 and to prevent any danger of contact between the connections, as might be caused by the rotation of the conductors if pins 22 and recesses 21 were not provided.

With this manner of connecting the conductors 4, several advantages occur, among which are the provision for relative movement between the sections of the conductor and between the conductors and the duct to allow for expansion of the conductors and for relative expansion between the conductors and the duct. This provision for expansion may be quite important in duct systems of great length which may occur in certain installations where the total movement caused by temperature variation might be large. Furthermore, if the connectors are removed, the conductors 4 are spaced and isolation and separate feeding of groups of sections of the system are provided for. This permits feeding of the system from many desired arrangements without the provision of special insulation although to make this isolation more sure, insulated parts may be inserted between the ends of the conductors, but this is not considered ordinarily necessary as the spacing will provide ample isolation therebetween. Where this isolation of sections is used, locking of the covers 26 by means of locking hasps may be provided to prevent accidental or undesirable changes in the isolating or separating. This is illustrated in Figure 15 where the covers are connected at the top by the hinged plates 67 and have the bottom straps 68 receiving the hasps of a lock 69.

Figure 16 illustrates schematically a wiring diagram of the separate feeding of two isolated groups of conductor sections. The isolation or separation of conductors occurs at the section junction indicated at 71, although it is understood that any other of the junctions may be separated to transfer any portion of the load served by the distribution duct to either of the feeder sources. Similarly, more than one junction may be disconnected to isolate an entire section or group for manipulation, and, further, the connection or disconnection at junctions may be carried out to provide supply from any number of feeders or in any system relation desired. Where the disconnection of a junction has been effected, it will ordinarily be desirable to utilize the locking junction cover illustrated in Figure 15 so as to prevent unauthorized changes which might connect together systems of different voltage or phase relation, or which might result in one source feeding through to the other, or in which a section or group thought to be isolated might be connected up and become dangerous for manipulation. Further, for continuity of service desired, it might even be preferable to utilize the locking covers at some of the connected junctions although its primary purpose will be at the disconnecting junctions to prevent unauthorized or accidental connections of the section.

Current take off devices may take any desired form in that they may be automatic electric circuit breakers, exterior handle operated electric switches, cover operated switches, non-switching devices, or any other desired form of take off. A simple device is illustrated comprising a main body portion 31 upon which is hinged an openable cover 32 manipulated by the handle 33. Within the main body portion 31 are insulating blocks at 34 carrying fuse jaws 35 adapted to receive a protective fuse 36. Also, mounted on the body portion are spaced stationary jaws 37 disposed in pairs, with one jaw of each pair connected to a fuse jaw 35 and with the other jaw of each pair connected to a prong 38 adapted to engage conductors 4. U-shaped conducting bridging elements 39 mounted on the under surface of the cover 32 engage and electrically connect the pairs of jaws 37 to establish the circuit therethrough. The prongs 38 extend from the back of the body portion 31 and are composed of conducting elements 39 spaced apart at their free ends to form jaws and formed of a conducting material such as copper. Backing up the conducting elements 39 for the maintenance of pressure upon the jaws are spring strip members 41 formed of steel or other resilient material, these being non-current-carrying parts used for the purpose of ensuring the maintenance of an adequate pressure engagement between the conducting elements of the jaw and the conductors in the duct. The prongs 38 are surrounded by insulating tubes 40 to prevent accidental contact with the duct.

To the upper edge of the current take off unit 30 is mounted a bracket 42 having its free end provided with curved finger or claw portions at 43 adapted to be received within the openings 12 in the cup-shaped members 11. A similarly formed claw member 44 cooperating with the member 11 at the bottom of the duct is provided for securing the bottom of the current take off unit in place, the claw 44 being separate from the unit and loosely and removably connected thereto by the manipulable stud 45. The manner of connecting the units to the duct will be described in connection with Figures 6 and 7. The effected door 14 at the location desired is opened by loosening the studs 15 and 17, rotating the door through 180° and again tightening the stud 15. The current take off unit is then mounted in position with its upper bracket 42, having its claws or fingers 43 engaged within the opening 12 in the effected member 11, and with the jaws 39 extending through the openings 13 in the duct, the unit in this initial association with the duct assuming substantially the position shown in Figure 7. After this initial association, the unit 30 is swung downwardly into the position of Figure 6, whereupon the claw 44 is inserted in the openings in the effected member 11 on the bottom wall of the duct and the stud 45 tightened, whereupon the unit will be rigidly maintained in place. The connection of branch circuit conductors may be effected either prior to or after the attachment of the unit 30 to the duct. In the swinging of the unit 30 from the position of Figure 7 to that of Figure 6, the jaws 39 will embrace progressively the conductors 4 from the top toward the bottom of the base until in the final position the conductors are embraced by the prongs in conducting relation, as in Figure 6. Removal of the unit is effected in the reverse manner with the stud 45 loosened and the claw 44 removed from its associated supporting cup whereupon the unit is swung upwardly to disengage the prongs from the conductors, whereupon it is lifted bodily from the duct. By this means, it is seen that the units may be attached very quickly and very easily with the manipulation of only a single attaching screw and that the initial mounting of the unit on the duct prior to the engagement of the prongs with the conductors enables a considerable leverage to be applied in the swinging downwardly of the unit, so that the prongs and conductors may be engaged with much less physical exertion than would be required by a straight line engagement of the prongs with the conductors in the duct.

The section of Figure 7 differs slightly from that of Figure 6 in that two additional small conductors are shown within the duct. These are mounted and connected similarly to the main conductors 4 except that the auxiliary conductors are connected together at the junction between sections, as will be explained in connection with the modification of Figure 13. These additional conductors of Figure 6 which are indicated at 46 are provided where 4-wire solid neutral service in the distribution duct is desired. In this case, an additional jaw 47 is provided on the unit 30 to engage conductor 46 for the neutral connection.

One feature of the invention lies in the efficiency of the current carrying parts for different current ratings while maintaining their use with standardized current take off units. This is indicated in connection with Figures 12 and 13 wherein, in Figure 12, the main conductors 48, as well as the neutral conductors 49, are shown in the form of hollow tubes, this construction being used for a lesser current rating of the device than is provided by the solid rods 4 of the other figures. Not only does this result in a great saving of copper, but the copper used is used more efficiently since it is well known that the current tends to concentrate in the outer surface of the conductor so that not only is the central copper saved, but that copper which is used in the thickness of the tube conducts current more efficiently since the removed central portion of the tube would, if used, have been operated at a lower current density. With this feature of the invention, the current take off units 30 can all be standard, since the exterior diameters of the conductors are all the same whether they are the rods 4 or the tubular conductors 8. Accordingly, so far as the attachment of current take off devices is concerned, the current carrying ratings of the conductors within the duct are immaterial. At the same time, the conductors are in their most efficient form, particularly when in the tubular form, as shown in Figure 12, and also no greater copper sectional area need be used in the lower current ratings than is actually required by the desired rating, while at the same time the common exterior diameter provides for use of standard current take off devices upon a large variety of different conductor rating ducts.

This flexibility concept is carried further in the duct form illustrated in Figure 13. This figure is a section taken adjacent the junction of duct sections and showing the contiguous insulator support in elevation. In this duct, the conductors 4 are mounted in parallel arrangement as shown therein. The only changes in the duct involve an elongation of the legs of the section heretofore indicated as 2, the equivalent elongated section in Figure 13 being shown at 52, and with the addition of a second cup-shaped member 11 here indicated at 61. The insulator 5 is replaced by the enlarged insulator 55 and the double opening therein, the channel shaped member 8 is replaced by the elongated member 77 and the channel 24 is replaced by the elongated channel 78. In conductor connections, the flexible conducting straps 27 remain the same as do the backing portions 28 at the outside extremities of the double conductors. However, there is now provided an intermediate connector element formed of a pair of groups of conducting elements as at 62 connected at their ends to each other and to an intermediate and conducting element, such as copper, at 63. Through bolts 64 extend similarly to the bolts 29 through one element 28, the thin conducting strips 27, the conducting element 63 and the conductors 4 are threaded into the opposite backing elements 28. The connection between the auxiliary conductors 46 is shown in this figure and this is the same as that previously described for the double conductors 4 with the addition of the elongated conducting element 65 substituted for the conducting element 63. A U-shaped insulating sheet 66 formed, for example, of fiber, may be provided to ensure insulation of the neutral conductors 46 from conductors 4. In this arrangement, it is seen that this connection, similar to that shown in Figures 8, 9 and 10, provides for the changes in the length of the conductor and for their disconnection for the isolation and separate feeding of groups thereof. Also, it is seen that the position of the cup-shaped members 11 with respect to the conductors 4 aligned therewith is the same as in the single conductor bus previously described and that the relation of the cup-shaped member 61 with relation to the conductors aligned therewith is, on the opposite side, the same as that with respect to the cup-shaped members 11 and their related conductors. Accordingly, it is again seen that the same current take off units may be used with the duct of Figure 13, although the capacity of the duct in Figure 13 has been doubled over that illustrated in Figures 1 to 11.

A concrete example will be given to more fully explain the flexibility in current rating while maintaining the standard current take off unit. For example, current ratings for ducts which might be standardized upon are 250 amperes, 375 amperes, 500 amperes, 750 amperes and 1000 amperes. In this case a copper cross ection for the conductor 4 would be determined to provide the desired rating of 500 amperes, then for the lesser ratings of 250 amperes and 375 amperes tubes would be selected having the same exterior diameter as the rod 4, but having an interior diameter determined by a wall thickness necessary to give the necessary copper cross section for the desired rating, and, in this instance, the tube for the rating of 250 amperes would, of course, have the lesser wall thickness and a lesser copper cross section than would the tube for the 375 ampere rating. The single tubes and rods would, therefore, provide for current rating of 250, 375 to 500 amperes. For the 750 ampere rated duct, two tubes of the wall thickness utilized for the 375 ampere single conductor section would be connected together in the manner shown in Figure 13, this parallelling of the tubes obviously doubling the current carrying capacity thereof. Similarly for the 1000 ampere rated duct, two solid rods as used for 500 amperes would be connected together as shown in Figure 13, the parallelling again doubling the current carrying capacity. With this arrangement it is seen that a large desired number of current rated ducts can be provided having conductors with the same exterior diameter and utilizing the conductor providing only the copper cross-section required and utilizing this cross-section in its most efficient form, while at the same time maintaining a standardized current take off unit applicable to all the different ratings.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. A current distribution duct system comprising an enclosure having rigid, round conductors extending therethrough, said conductors having a common external diameter and certain of them being tubular with varied wall thicknesses and other solid rods so as to supply only a sufficient copper cross-section to maintain a predetermined current density for varied current ratings for the conductors in the duct, the conductors regardless of current carrying capacity maintaining the common external diameter so as to permit the association of standardized current take off units therewith regardless of the current carrying capacity of the conductors within the duct.

2. A current distribution duct system comprising an elongated outer enclosure having rigid conductors extending therethrough, said conductors having cylindrical external surfaces of a common diameter, a plurality of current take off units adapted to be associated with said duct and having current collector elements of standardized dimensions for cooperating with the standardized cylindrical surfaces of the conductors, the conductors of the system being of varied current ratings and having copper cross-sections giving predetermined current densities in the varied ratings, certain of said conductors being tubular and others solid rods so as to provide the desired copper cross-section while maintaining the standardized diameter of the cylindrical external surfaces.

3. A current distribution duct system comprising an outer sheet metal enclosure having rigid conductors extending therethrough and insulated from each other and from the duct, said conductors having cylindrical external surfaces of a common diameter, a plurality of current take off units adapted to be associated with said duct and having current collector elements of standardized dimensions for cooperating with the standardized cylindrical surfaces of the conductors, the conductors in the system being of varied current ratings and having copper cross-sections corresponding to the varied ratings so as to give predetermined current densities in said conductors, said conductors being tubular with varied wall thicknesses for the lower current capacities, solid rods for intermediate capacities, and being connected mechanically and electrically in parallel in both the tubular and rod form for higher current capacities, the standardized units being associatable with all current rating conductors regardless of capacity in view of their common exterior dimensions.

4. A current distribution duct comprising an elongated sheet metal enclosure formed of sections connected in end to end relation, round, rigid conductors within said enclosure, insulating elements within said enclosure and mounting said conductors so as to insulate them from each other and from the duct, means providing for attachment of current take off units to the duct in current carrying relation with said conductors, said conductors being formed of sections corresponding with the duct sections, means joining the ends of said conductor sections together, openings in the duct providing access to said conductor section junctures, and means preventing rotation of said conductors within the duct so that the section junctures will always be readily accessible through said openings.

5. A current distribution duct comprising an elongated sheet metal enclosure formed of sections connected in end to end relation, round, rigid conductors within said enclosure, insulating elements within said enclosure and mounting said conductors so as to insulate them from each other and from the duct, said conductors being formed in sections corresponding with the duct sections and having expansion joints therebetween, and means interlocking with the conductors and the insulating elements and preventing rotation of the conductors while permitting limited longitudinal movement thereof relative to the insulating elements.

6. A current distribution duct system comprising an elongated enclosure, a plurality of rigid elongated conductors within said enclosure with their axes substantially parallel to the axis of the enclosure, a plurality of openings spaced along the length of said enclosure in said enclosure through which access may be had to said conductors, a current take off unit having a plurality of current collector elements adapted to engage said conductors in the duct through one of said openings, interengaging means on said duct and at one side of said unit engageable prior to the connection of said current collector elements with the conductors while the unit is tilted with relation to the plane of said duct, said unit being thereafter swingable about said interengaging means and at right angles to the axes of said conductors to progressively engage the current connecting elements with the conductors as the unit is moved into planar engagement with the duct.

7. A current distribution duct system comprising an elongated enclosure, a plurality of rigid elongated conductors within said enclosure with their axes substantially parallel to the axis of the enclosure, a plurality of openings spaced along the length of said enclosure in said enclosure through which access may be had to said conductors, a current take off unit having a plurality of current collector elements adapted to engage said conductors in the duct through one of said openings, interengaging means on said duct and at one side of said unit engageable prior to the connection of said current collector elements with the conductors while the unit is tilted with relation to the plane of said duct, said unit being thereafter swingable about said interengaging means and at right angles to the axes of said conductors to progressively engage the current connecting elements with the conductors as the unit is moved into planar engagement with the duct, and similar interengaging means on said duct and at the opposite side of said unit, said last mentioned means being engageable with the unit in place to prevent movement thereof about said first interengaging means.

8. A current distribution duct comprising an elongated sheet metal enclosure, a plurality of rigid elongated conductors within said enclosure with their axes substantially parallel to the axis of the enclosure, a current take off unit having a plurality of current collector elements adapted to engage with said conductors within the duct, means mounting and supporting said current take off unit on the duct, including an opening in the said wall of the duct through which said current collector elements extend, interengaging means on the top wall of said duct and on the unit, said interengaging means being interlocked with the unit supported on but inclined with respect to the duct prior to the engagement of said current collector elements with the conductors, said unit being thereafter swingable about said interengaging means into a position against the side wall of the duct with the current collector elements engaging the conductors, and manipulable means for engaging said current take off unit with the duct to prevent reverse swinging movement thereof until desired.

9. A current distribution duct comprising an elongated sheet metal enclosure, a plurality of rigid elongated conductors within said enclosure with their axes subtsantially parallel to the axis of the enclosure, openings in the walls of said enclosure through which access may be had to said conductors, a current take off unit having a plurality of current collector elements adapted to engage with said conductors through the openings in the duct, a supporting element upon a wall of said duct at right angles to the wall in which said opening occurs, said current take off unit being disposed against the wall in which said opening occurs, and having a mounting portion extending into engagement with said mounting element on the duct, said mounting portion on the unit being engageable with the mounting element on the duct to support the unit from the duct prior to the engagement of the current collector elements with the conductors in the duct and while the unit is tilted with respect to the duct wall, said unit being swingable about the engagement of said mounting portion with said mounting element in a plane at right angles to the axes of the conductors to move the unit into engagement with the duct wall and the current collector elements into engagement with the conductors in the duct, said unit being similarly releasable from the duct by swinging it upwardly at right angles to the axis of the conductors until the current collector elements are disengaged, whereupon the mounting portion on the unit may disengage from the mounting element on the duct and the unit bodily removed.

10. A current distribution duct comprising an elongated sheet metal enclosure of rectangular cross-section, formed of a plurality of sections joined in end to end relation, round, rigid conductors mounted within said enclosure, said conductors being spaced apart in a plane which corresponds with the longer axis of said rectangular cross-section, an opening in the long wall of said rectangle through which access may be had from the exterior of the duct to said conductors, a current take off unit adapted to be disposed along the longer wall of said rectangle and having current collector elements adapted to extend through said opening into engagement with the conductors, a mounting bracket on a smaller wall of said rectangle having engageable portions thereon substantially aligned with said long rectangle axis, and a claw on said unit engaging with said mounting bracket, while the unit is tilted with respect to the longer wall of said rectangle, said unit being thereafter swingable in a plane at right angles to the axes of the conductors to engage the current collector elements therewith.

11. A current distribution duct comprising an elongated sheet metal enclosure of rectangular cross-section, formed of a plurality of sections joined in end to end relation, round, rigid conductors mounted within said enclosure, said conductors being spaced apart in a plane which corresponds with the longer axis of said rectangular cross-section, an opening in the long wall of said rectangle through which access may be had from the exterior of the duct to said conductors, a current take off unit adapted to be disposed along the longer wall of said rectangle and having current collector elements adapted to extend through said opening into engagement with the conductors, a mounting bracket on a smaller wall of said rectangle having engageable portions thereon substantially ligned with said long rectangle axis, a claw on said unit engaging with said mounting bracket while the unit is tilted with respect to the longer wall of said rectangle, said unit being thereafter swingable in a plane at right angles to the axes of the conductors to engage the current collector elements therewith, a duplicate mounting bracket on the second smaller wall of said rectangle and a manipulable claw connectable with said second bracket and said unit to lock the unit in its connected position.

12. A current distribution duct formed of a plurality of sections connected in end to end relation, each of said sections comprising a pair of U-shaped elements adapted to be connected together to form a generally rectangular enclosure, the legs of one of said elements being straight and the ends of the legs of the other element having offset portions cooperating with the end of the legs of the first element to form substantially plane interior surfaces for the enclosure, mounting brackets disposed on the top and bottom walls of said enclosure and having recesses receiving said offset portions to prevent rotation of said mounting brackets, and common screw means extending through said brackets and the legs of said elements to mount the duct elements together and the mounting brackets thereon, said mounting brackets cooperating with current take off units to mount and support the same on the duct.

13. A current distribution duct formed of a plurality of sections connected in end to end relation, each of said sections comprising a pair of U-shaped elements adapted to be connected together to form a generally rectangular enclosure, the legs of one of said elements being straight and the ends of the legs of the other element having offset portions cooperating with the ends of the legs of the first element to form substantially plane interior surfaces for the enclosure, mounting brackets disposed on the top and bottom walls of said enclosure and having recesses receiving said offset portions to prevent rotation of said mounting brackets, insulating elements disposed in said duct and having openings therethrough through which extend conductors within the duct, brackets engageable with said insulating elements to hold the same in position, and screw means extending through said mounting brackets, the legs of said elements, and threaded into said insulator brackets to rigidly mount the brackets and duct elements together to form the rectangular enclosure with the mounting and insulator supporting brackets rigidly connected thereto.

14. A current distribution duct comprising an elongated sheet metal enclosure formed of a plurality of sections connected in end to end relation, said duct sections enclosing rigid conductors in sections corresponding to the duct sections and also connected in end to end relation, said conductors being spaced apart and from the enclosure surfaces in insulating relation, said conductors being symmetrically disposed with respect to the opposite sides of the enclosure, spaced openings along the length of the enclosure in said opposite side walls for the association of current take-off units, said conductors having a common external diameter and certain of them being tubular and others solid rods so as to supply only a sufficient copper cross-section to maintain a predetermined current density for varied current ratings for the conductors in the duct while permitting the association of standardized current take-off units therewith.

15. A current distribution duct comprising an elongated sheet metal enclosure formed of a plurality of sections connected in end to end relation, said duct sections enclosing rigid conductors in sections corresponding to the duct sections and also connected in end to end relation, said conductors being spaced apart and from the enclosure surfaces in insulating relation, said conductors being symmetrically disposed with respect to the opposite sides of the enclosure, spaced openings along the length of the enclosure in said opposite side walls for the association of current take-off units, said conductors having a common external diameter and certain of them being tubular and others solid rods so as to supply only a sufficient copper cross-section to maintain a predetermined current density for varied current ratings for the conductors in the duct while permitting the association of standardized current take-off units therewith, current carrying capacity beyond the solid rod construction being secured by the use of additional conductors disposed alongside of said spaced conductors and electrically connected in parallel therewith, one of each set of electrically common conductors being disposed in the same relationship to the adjacent enclosure side wall as in the case of single conductors so as to permit the association of the standardized units at both sides of the enclosure with one or the other of the electrically common diameter.

16. A current distribution duct system comprising an enclosure having rigid, round conductors extending therethrough, said conductors having a common external diameter and being tubular with varied wall thicknesses so as to supply only a sufficient copper cross-section to maintain a predetermined current density for varied current ratings for the conductors in the duct, the conductors regardless of current carrying capacity maintaining the common external diameter so as to permit the association of standardized current take-off units therewith.

17. A current distribution duct system comprising an elongated outer enclosure having rigid conductors extending therethrough, said conductors having cylindrical external surfaces of a common diameter, a plurality of current take-off units adapted to be associated with said duct, and having current collector elements of standardized dimension for cooperating with the standardized cylindrical surfaces of the conductors, the conductors of the system being of varied current ratings and having copper cross-sections giving predetermined current densities in the varied ratings, said conductors being tubular with varied wall thicknesses so as to provide the desired copper cross-section while maintaining the standardized diameter of the cylindrical surfaces.

18. A current distribution duct comprising an elongated sheet metal enclosure formed of a plurality of sections in an end to end relation, said duct sections enclosing rigid conductors in sections corresponding to the duct sections and also connected in end to end relation, said conductors being spaced apart and from the enclosure surfaces in insulating relation, said conductors being symmetrically disposed with respect to the opposite sides of the enclosure, spaced openings along the length of the enclosure in said opposite side walls for the association of current take-off units, said conductors having a common external diameter and being tubular with varied wall thicknesses so as to supply only a sufficient copper cross-section to maintain a predetermined current density for varied current ratings for the conductors in the duct while permitting the association of standardized take-off units therewith.

JOHN G. JACKSON.
RALPH H. KINGDON.

REFERENCES CITED

The following references are of record in the file of this patent:

UNITED STATES PATENTS

| Number | Name | Date |
|---|---|---|
| 461,195 | Dillon | Oct. 13, 1891 |
| 1,433,827 | Kimble | Oct. 31, 1922 |
| 1,640,814 | Blackwood | Aug. 30, 1927 |
| 1,965,181 | Gerlach | July 3, 1934 |
| 1,967,340 | Van Splunter | July 24, 1934 |
| 1,986,965 | Frank | Jan. 8, 1935 |
| 2,009,376 | Frank | July 23, 1935 |
| 2,037,026 | Hubbell | Apr. 14, 1936 |
| 2,043,796 | Frank | June 9, 1936 |
| 2,088,105 | Frank | July 27, 1937 |
| 2,096,313 | Anderson | Oct. 19, 1937 |
| 2,122,298 | Scott | June 28, 1938 |
| 2,124,269 | Anderson | July 19, 1938 |
| 2,161,571 | Harvey | June 6, 1939 |
| 2,170,299 | Frank | Aug. 22, 1939 |
| 2,192,899 | Edmonson | Mar. 12, 1940 |
| 2,211,109 | Frank | Aug. 13, 1940 |
| 2,261,857 | Novak | Nov. 4, 1941 |
| 2,264,075 | Frank | Nov. 25, 1941 |

FOREIGN PATENTS

| Number | Country | Date |
|---|---|---|
| 32,582 | Denmark | Dec. 3, 1923 |
| 317,256 | Italy | Apr. 30, 1934 |